May 12, 1964  A. S. BAGLEY ETAL  3,133,189
ELECTRONIC INTERPOLATING COUNTER FOR THE TIME
INTERVAL AND FREQUENCY MEASUREMENT
Filed Aug. 5, 1960
2 Sheets-Sheet 1
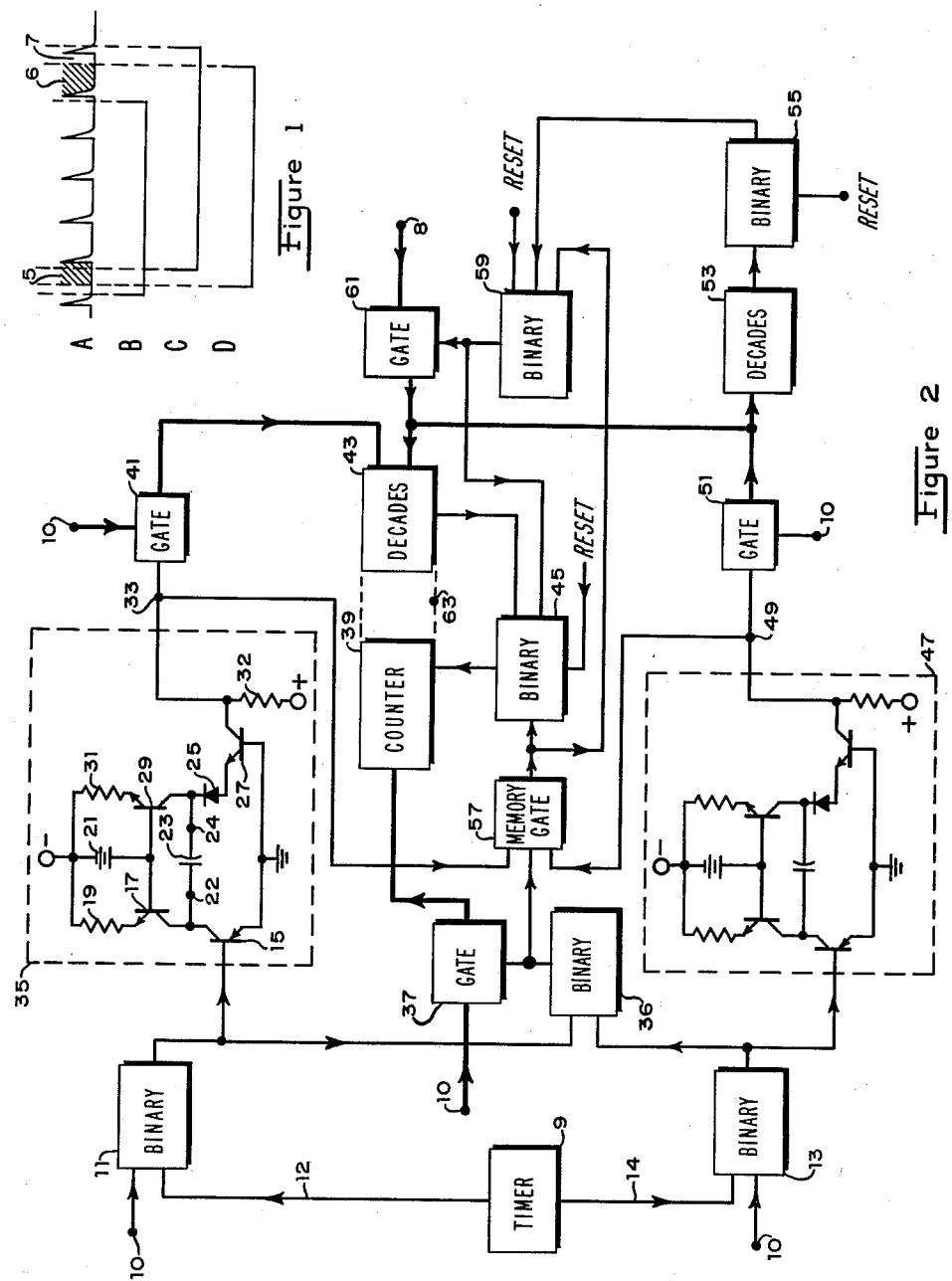
INVENTOR
ALAN BAGLEY
MERRILL BROOKSBY
BY
ATTORNEY United States Patent Office 3,133,189
Patented May 12, 1964

3,133,189
ELECTRONIC INTERPOLATING COUNTER FOR THE TIME INTERVAL AND FREQUENCY MEASUREMENT
Alan S. Bagley, Los Altos, and Merrill W. Brooksby, Menlo Park, Calif., assignors to Hewlett-Packard Company, Palo Alto, Calif., a corporation of California
Filed Aug. 5, 1960, Ser. No. 47,753
17 Claims. (Cl. 235—92)

This invention relates to electronic counting circuits and to a method and means for increasing their accuracy.

It is known that electronic counters can measure repetition frequency by counting over a predetermined time interval pulses having the same repetition frequency as the input signal. It is also known that time interval measurements can be made on an electronic counter by counting during the time interval to be measured pulses having a predetermined repetition frequency. Thus, given the counting period it is possible to measure frequency, and given the frequency it is possible to measure time interval.

The accuracy of an electronic counting circuit is usually limited to plus or minus one count as a result of the relationship between the first and the last pulses to be counted with respect to the specified interval. Although an error of one count in a million occurrences can usually be neglected, an error of one count in one hundred occurrences is quite appreciable. Where greater accuracy is required at low repetition frequencies, it is possible to obtain a more accurate count by counting pulses over an extended time and dividing the extended count by the extended counting time. This method requires a longer counting period and requires an additional calculation to obtain the proper answer. It is also possible to obtain a more accurate count by multiplying the repetition frequency of the pulses to be counted and counting the pulses recurring at the higher repetition frequency. This method requires more complex and expensive high frequency counting circuitry.

It is an object of the present invention to provide a circuit which will provide a direct reading of unknown frequency or time interval.

It is another object of the present invention to provide a circuit which will count with greater accuracy than plus or minus one count.

It is a further object of the present invention to provide a circuit which will produce the degree of accuracy normally obtained by extending the counting time or by counting at higher frequencies, but without the concomitant decrease in measurement speed or increase in complexity and expense.

It is still another object of the present invention to provide a circuit which will expand by a predetermined value the time interval occurring between a command signal and the next successive pulse to be counted.

Other and incidental objects of this invention will be apparent from a reading of the specification and an inspection of the accompanying drawing in which:

FIGURE 1 is a graph showing the various relationships between the pulses to be counted and the counting interval;

FIGURE 2 is a schematic diagram of an embodiment of the present invention and,

Figure 3:
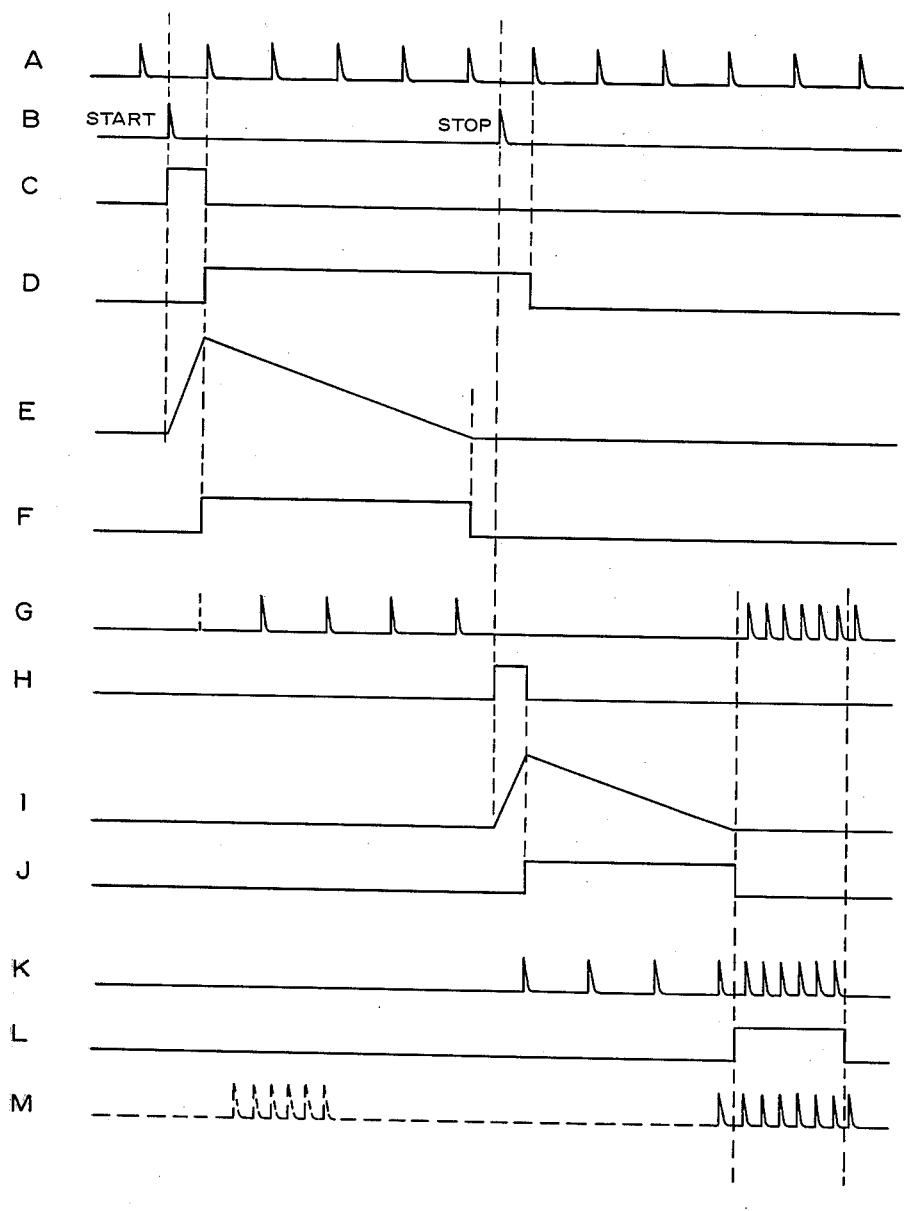
FIGURE 3 is a graph showing the time sequence operation of the circuit of FIGURE 2.

*General Description of the Operation of the Circuit of FIGURE 2*

Referring now to FIGURE 1, the pulses to be counted, FIGURE 1A, may represent a known frequency or the frequency of the applied signal. It can be seen that the count taken in the selected interval between the start and stop pulses of FIGURE 1B is one count less than the count taken in the interval between the start and stop pulses of FIGURE 1D. Further, it can be seen that the count taken in the interval between the start and stop pulses of FIGURE 1C is one count greater than the count taken in the interval between the start and stop pulses of FIGURE 1D. Thus the number of pulses counted over substantially equal time intervals can vary by plus or minus one count. In order to increase the count accuracy, time interval 5 occurring between the start pulse of FIGURE 1D and the next pulse to be counted is expanded by a predetermined factor. The pulses of FIGURE 1A are counted by a first counter during the time interval between the start and stop pulses of FIGURE 1D and are counted at the same time by a second counter during the expanded time interval. The time interval 6 occurring between the stop pulse and the previous pulse to be counted should be expanded by the same factor. However, since time interval 6 occurs prior to the stop pulse, it is easier to expand the time interval 7 between the stop pulse and the next pulse to be counted. By applying to the second counter a number of pulses equal to the complement of the number of pulses counted in this last expanded interval, it is possible to obtain a count of the total number of pulses occurring in the expanded intervals corresponding to intervals 5 and 6. The count taken of the number of pulses occurring in the interval between the start and stop pulses of FIGURE 1D is then altered in response to the total number of pulses counted by the second counter. Altering the count includes adding most significant fractional figures to the count in addition to advancing the count by the number of carry signals derived from the total count of pulses occurring in the expanded time interval. For an approximate count of 685 pulses occurring in the selected interval between start and stop pulses, the second counter may count a total of 75 pulses in the expanded intervals associated with the start and stop pulses. The altered count would then be 685.75. If the second counter counted a total of 175 pulses in the expanded intervals associated with the start and stop pulses, the altered count would be 686.75 as a result of the carry signal derived from the expanded interval count. The counter of the present example thus provides accuracy comparable to that attainable by counting for 100 times the selected interval and dividing by the same factor but without the concomitant delay in measurement speed.

Referring now to FIGURE 2 which shows a schematic diagram of an embodiment of the present invention, the operation of the circuit is controlled by timer 9 which applies a start signal to binary 11 through line 12 and a stop signal to binary 13 through line 14. Input pulses which are applied to input terminal 10 are counted over the time interval starting with the start signal and ending with the stop signal. Start signals appearing on line 12 will, in general, not be coincident with pulses appearing at input terminal 10. Thus binary 11 initiates an output pulse at its output terminal when the start signal is applied, and terminates the output pulse when the next pulse to be counted appears at terminal 10. The output pulse of binary 11, which has a pulse width equal to the time between the application of the start signal and the appearance at terminal 10 of the next pulse to be counted, is expanded by expander 35. The output pulse of binary 11 holds normally-conducting transistor 15 in the non-conducting state. The current from the current source comprising transistor 17, resistor 19 and voltage source 21, which normally flows through the conducting transistor 15 to ground, then flows into terminal 22 of capacitor 23. Terminal 24 of the capacitor is clamped to ground through the normally conducting diode 25 and transistor 27. Voltage appearing at terminal 22 of the capacitor will then charge toward the negative supply voltage with respect to ground. When the output pulse of binary 11 is terminated, transistor 15 is again rendered conductive, thereby clamping terminal 22 to ground. Since the voltage across capacitor 23 cannot change instantaneously, the voltage at terminal 24 jumps positively when terminal 22 is clamped to ground, thereby rendering diode 25 nonconductive. The current from the current source comprising transistor 29, resistor 31 and voltage source 21, which normally flows through the conducting diode 25 and transistor 27, then flows into terminal 24 of capacitor 23. This current is made smaller than the current from the first mentioned current source. Thus, the capacitor voltage at terminal 24 with respect to ground charges toward the negative supply voltage at a slower rate than the capacitor voltage at terminal 22 with respect to ground was charged. At the instant when the voltage at terminal 24 is substantially zero, diode 25 and transistor 27 are rendered conductive, thereby clamping the capacitor voltage to ground. The duration of the pulse appearing across the biasing resistor 32 and hence at terminal 33 represents the time interval between the application of the start signal and the appearance of the next pulse to be counted multiplied by the ratio of the first charging current to the second charging current. For this reason, the circuitry of 35 is referred to as a time interval expander. The ratio of charging currents can be made any suitable value, say 10 or 100, that is necessary to obtain the desired accuracy.

Other techniques for expanding the time interval occurring between the start signal and the next pulse to be counted are also possible. For example, a count of pulses recurring at a very high frequency can be taken during the said time interval and compared with a subsequently taken count of pulses recurring at a submultiple of the first frequency. Thus, the time required to count an equal number of the lower frequency pulses is related to the time during which the higher frequency pulses are counted by the ratio of the high frequency to the low frequency.

At the instant when the pulse appearing at the output terminal of binary 11 is terminated, gate 37 is rendered conductive by the output pulse of binary 36, thereby permitting pulses appearing at terminal 10 to be applied to counter 39. And during the expanded time interval, as represented by the pulse appearing at terminal 33, gate 41 is held conductive, thereby permitting the pulses appearing at terminal 10 to be applied to decades 43. An output signal, if any, from decades 43, which represents a decimal carry figure, is stored in binary 45. The readouts of decades 43 are physically located to the right of decimal point 63 to provide the fractional figures required for greater count accuracy.

A stop signal appearing on line 14 initiates a pulse at the output of binary 13, and the appearance at terminal 10 of the next pulse to be counted terminates the output pulse of binary 13. At the instant when the output pulse of binary 13 is terminated, gate 37 is closed by binary 36, thereby precluding the application of pulses to counter 39. Counter 39 is designed to count one less than the number of pulses applied thereto in the interval between the start and stop signals. The output pulse of binary 13 is expanded by the circuitry of 47 in a manner as previously described in connection with the circuitry of 35. Thus, the pulse appearing at terminal 49 represents the interval between the stop signal and the next successive pulse to be counted, expanded by the same predetermined factor. The pulse appearing at terminal 49 renders gate 51 conductive, thereby permitting the pulses appearing at terminal 10 to be applied to decades 53. The output signal, if any, from decades 53 which represents a decimal carry is stored in binary 55.

It is possible to eliminate expander 35 by synchronizing the operation of the timer with the pulses to be counted so that the start signal appears in coincidence with a pulse. In this manner, the count taken by counter 39 can be altered in response to the complementary number of pulses counted by a second counter during the expanded interval corresponding to the interval following the stop signal. It is also possible to eliminate one expander by using the other to expand the intervals following the start and stop signals, providing the first expanded interval never overlaps the second expanded interval.

The following description relates to the procedure involved in advancing the count obtained by counter 39 in response to the information stored in decades 43, decades 53 and in the decimal carry binaries 45 and 55. It has been pointed out that counter 39 counts the pulses applied through gate 37 during the selected interval occurring between the start signal and the stop signal. It has also been pointed out that decades 43 count the pulses applied through gate 41 during the expanded time interval occurring between the start signal and the next successive pulse to be counted. Further, it has been pointed out that decades 53 count the pulses applied through gate 51 during the expanded interval occurring between the stop signal and the next successive pulse to be counted. It is necessary to recall the counts taken during the expanded intervals by decades 43 and 53 in order to facilitate advancement of the count taken by counter 39. Since decades 53 count pulses applied during the expanded interval which occurs after the stop signal, and since the information required is the number of pulses counted in the interval between the stop signal and the pulse that appeared just prior to the stop signal, it is necessary to obtain the complement of the count stored in decades 53. To this end, memory gate 57 is provided to produce an output signal subsequent to the operation of gates 37, 41 and 51. The pulse appearing at the output of memory gate 57 triggers binaries 45 and 59. The carry, if any, stored in binary 45 is then transmitted to counter 39, thereby advancing the count by one.

Assuming that no carry is stored in binary 55, the output pulse from gate 57 triggers binary 59 which, in turn, renders gate 61 conductive. Pulses appearing at terminal 8, which may be the pulses to be counted, the pulses to be counted multiplied in frequency, or externally generated pulses, are thus applied to decades 43 and 53. Binary 55 is triggered by the decimal carry output signal of decades 53 when the number of pulses applied thereto and to decades 43 (i.e. the complementary number) is sufficient to produce the said carry signal. Binary 55 triggers binary 59, thereby closing gate 61. Thus, the number of pulses counted by decades 43 is equal to the number of pulses counted in the expanded time interval plus the complementary number of pulses required to set decades 53 to the carry signal condition. If, as is the general case, the complementary number of pulses added to decades 43 is not sufficient to generate a carry signal, then the count taken by counter 39, as previously advanced, remains unchanged.

In the case where binary 45 stores a carry and decades 53 have no count, the signal appearing at the output of gate 57 triggers binary 45, thereby transferring the stored count to counter 39. The signal at the output of gate 57 also triggers binary 59, thereby opening gate 61. Pulses are thus applied to decades 43 and decades 53 until the carry signal generated by decades 53 triggers binary 59 through binary 55, thereby closing gate 61. Decades 43 thus produce another carry which is stored momentarily in binary 45 and which is transmitted to counter 39 at the same time that gate 61 is closed. In this manner counter 39 will be advanced a total of two counts subsequent to the termination of the selected count interval. Resetting means are provided to return binaries 45, 55 and 59 to their original state after the completion of a counting cycle.

Other methods of altering the count taken during the selected interval in accordance with the counts taken during the expanded intervals are also possible. By way of example, the count taken by counter 39 of pulses applied thereto during the selected interval may be an exact count which is advanced one count if the sum of the pulses counted during the expanded time intervals produce two carry signals, is not advanced if only one carry signal is produced, and is reduced one count if no carry signals at all are produced.

The illustrated embodiment of the present invention has been described using decades to count and store the number of pulses applied thereto during the expanded intervals following the start and stop signals. It should be understood that other means for counting and storing information related to the number of pulses applied during the expanded intervals are within the scope and true spirit of the present invention. For example, a counting and storing circuit which supplies an incremental amount of charge to a fixed capacitor for each applied pulse provides the required count information in the form of an analogue voltage which is proportional to the number of pulses applied thereto.

The operation of the circuit of FIGURE 2 will now be summarized with reference made to the waveforms of FIGURE 3. The start signal appearing on line 12 initiates an output pulse, FIGURE 3C, at the output of binary 11, which output pulse causes the voltage across capacitor 23 to charge positively as shown in FIGURE 3E. When the next pulse to be counted is applied to binary 11, the pulse appearing at the output thereof is terminated, as shown in FIGURE 3C. This causes gate 41 to open, FIGURE 3F, and the voltage across capacitor 23 to discharge toward the negative supply voltage, as shown in FIGURE 3E. Gate 37 is also opened at the instant when the output pulse of binary 11 is terminated as shown in FIGURE 3D. Gate 41 remains open for the duration of the run-down time of the voltage across capacitor 23. The slope of the run-down time is made smaller than the charging time by some factor, say, 1/10. Gate 41 closes at the instant when the voltage appearing across capacitor 23 is substantially zero, thereby establishing a relationship that the time during which 41 is conducting, FIGURE 3F, is ten times longer than the time interval between the start pulse and the next pulse to be counted, as shown in FIGURE 3C. During the time that gate 41 is open, pulses are being counted by decades 43, as shown in FIGURE 3G.

When the stop pulse is applied to binary 13 of FIGURE 2, a pulse is initiated at the output thereof, as shown in FIGURE 3H, and the voltage across the capacitor of the time expander 47 begins to charge positively, as shown in FIGURE 3I. The next successive pulse which appears at terminal 10 terminates the output pulse of binary 13. This causes gate 37 to close thereby stopping counter 39, and causing the voltage across the capacitor of the time expander 47 to discharge towards the negative supply voltage as shown in FIGURE 3I. Gate 51 is opened at the instant when the pulse appearing at the output of binary 13 is terminated and remains open until the voltage across the capacitor of time expander 47 is substantially zero, as shown in FIGURE 3J. During the time that gate 51 is conducting, pulses are applied to decades 53, as shown in FIGURE 3K. Since the first pulses applied to decades 43 and 53 of FIGURE 2 cannot both be counted, one decade, say 53, is designed to count the first pulse applied whereas the other is not. After the operation of gates 37, 41 and 51 is completed, as shown in FIGURES 3D, 3F and 3J respectively, gate 61 is opened, as shown in FIGURE 3L. Gate 61 permits a sufficient number of pulses to pass to enable decades 53 to produce an output carry signal. Thus, the number of pulses counted by decades 43 is equal to the number of pulses counted during the expanded time interval plus the number of pulses required to produce a carry signal at the output of decades 53. Pulses appearing at terminal 8 can be the pulses of FIGURE 3A, the pulses of FIGURE 3A multiplied in frequency, or pulses generated by additional means, as shown in FIGURE 3M.

When still greater accuracy is required, the counting operation of the present invention may be iterated until a count is achieved that is within the predetermined limits of accuracy.

It can be seen that the counting operation described in connection with the illustrated embodiment of the present invention provides greater count accuracy than plus or minus one count in relatively short counting time without using high frequency counting circuits or long term count averaging techniques. The counting circuit of the present invention is thus less expensive since it uses only relatively lower frequency counting circuits. In addition, the counting circuit of the present invention provides high count accuracy at greater measurement speed than is usually attainable using conventional counters.

We claim:
1. A circuit for counting pulses during a selected interval, said circuit comprising means forming pulses having the same frequency as the signal applied thereto, means to generate start and stop signals defining said selected interval, a gate, a first pulse counting means to count the number of pulses applied thereto according to a predetermined radix system, means including said gate to apply the pulses to said first counting means in response to said start signal, second pulse counting means, means to apply pulses to said second pulse counting means for a period related by a predetermined multiple of said radix to the interval between said start signal and the next successive pulse to be counted, the second pulse counting means counting the pulses during said period and producing an output signal when the number of pulses applied thereto equals a multiple of said radix, third pulse counting means, means to apply pulses to said third pulse counting means for a period related by said same multiple to the time interval between said stop signal and the next successive pulse to be counted, the third pulse counting means counting the number of pulses applied thereto during said last mentioned period, means including another gate responsive to the termination of said last mentioned period to apply said pulses to said second and third pulse counting means, said other gate passing a number of pulses required for said third counting means to count a number of pulses equal to said predetermined multiple of said radix, and means responsive to said output signal to alter the count of said first counting means.

2. A circuit for counting pulses during a selected interval, said circuit comprising means forming pulses having the same frequency as the signal applied thereto, means to generate start and stop signals defining said selected interval, a gate, a first pulse counting means to count one less than the number of pulses applied thereto according to a predetermined radix system, means including said gate to apply the pulses to said first counting means in response to said start signal, second pulse counting means, means to apply pulses to said second pulse counting means for a period related by a predetermined multiple of said radix to the interval between said start signal and the next successive pulse to be counted, the second pulse counting means counting said pulses during said period and producing an output signal when the number of pulses applied thereto equals a multiple of said radix, third pulse counting means, means to apply pulses to said third pulse counting means for a period related by said same predetermined multiple to the time interval between said stop signal and the next successive pulse to be counted, the third pulse counting means counting the number of pulses applied thereto during said last mentioned period, means including another gate responsive to the termination of said last mentioned period to apply said pulses to said second and third pulse counting means, said other gate passing a number of pulses required for said third counting means to count a number of pulses equal to the said predetermined multiple of said radix, and means responsive to said output signal to advance the count of said first counting means.

3. A circuit for counting pulses during a selected interval, said circuit comprising means forming pulses having the same frequency as the signal applied thereto, means to generate start and stop signals defining said selected interval, means to produce a first output pulse having a pulse width equal to the time between said start signal and the next successive pulse to be counted, a first gate, a first counter to count one less than the number of pulses applied thereto, means including said gate responsive to the termination of said first output pulse to apply the pulses to be counted to said first counter, means to expand said first output pulse by a predetermined factor, a second gate, a second counter producing an output signal when the number of pulses counted thereby equals a multiple of said predetermined factor, means including said second gate responsive to the expanded output pulse to apply the pulses to be counted to said second counter, means to produce a second output pulse having a pulse width equal to the time between said stop signal and the next successive pulse to be counted, said first gate responsive to the termination of said second output pulse to preclude application of the pulses to be counted to said first counter, means to expand said second output pulse by said same predetermined factor, a third gate, a third counter, means including said third gate responsive to said second expanded output pulse to apply the pulses to be counted to said third counter, a fourth gate, means including said fourth gate to apply the pulses to be counted to said second and third counters, said fourth gate passing a number of pulses equal to the complement of the number of pulses counted by said third counter, and means to advance the number of pulses counted by said first counter in response to the number of said output signals applied thereto.

4. A circuit for counting pulses during a selected interval, said circuit comprising means forming pulses having the same frequency as the signal applied thereto, means to generate start and stop signals defining said selected interval, means to produce a first output pulse having a pulse width equal to the time between said start signal and the next successive pulse to be counted, a first gate, a first counter to count one less than the number of pulses applied thereto, means including said first gate responsive to the termination of said first output pulse to apply the pulses to be counted to said first counter, means to expand said first output pulse by a predetermined factor, a second gate, a second counter to produce a first output signal when the number of pulses counted thereby equals a multiple of said predetermined factor, the readout of said second counter being physically located to provide the most significant fractional figures, a first binary to store said first output signal, means including said second gate responsive to said expanded output pulse to apply the pulses to be counted to said second counter, means to produce a second output pulse having a pulse width equal to the time between said stop signal and the next successive pulse to be counted, said first gate precluding the pulses to be counted from being counted by said first counter in response to the termination of said second output pulse, means to expand said second output pulse by said predetermined factor, a third gate, a third counter to produce a second output signal when the number of pulses counted thereby equals said predetermined factor, a second binary, means including said second binary to store said second output signal, means including said third gate responsive to said second expanded output pulse to apply the pulses to be counted to said third counter, a fourth gate to produce a third output signal subsequent to the operation of said first, second and third gates, means including a third binary to produce a control signal only when the said third output signal is applied thereto and no output signal is present in said second binary, a fifth gate responsive to said control signal to apply the pulses to be counted to said second and third counters, and means to advance the number of pulses counted by said first counter in response to the number of said first output signals applied to said first binary.

5. A circuit for counting pulses during a selected interval, said circuit comprising means forming pulses having the same frequency as the signal applied thereto, means to generate start and stop signals defining said selected interval, means to produce a first output pulse having a pulse width equal to the time between said start signal and the next successive pulse to be counted, a first gate, a first counter to count one less than the number of pulses applied thereto, means including said first gate responsive to the termination of said first output pulse to apply the pulses to be counted to said first counter, means to expand said first output pulse by a predetermined factor, a second gate, a second counter to produce a first output signal when the number of pulses counted thereby equals a multiple of said predetermined factor, the readout of said second counter being physically located to provide the most significant fractional figures, a first binary to store said first output signal, means including said second gate responsive to said expanded output pulse to apply the pulses to be counted to said second counter, means to produce a second output pulse having a pulse width equal to the time between said stop signal and the next successive pulse to be counted, said first gate precluding the pulses to be counted from being counted by said first counter in response to the termination of said second output pulse, means to expand said second output pulse by said predetermined factor, a third gate, a third counter to produce a second output signal when the number of pulses counted thereby equals said predetermined factor, a second binary, means including said second binary to store said second output signal, means including said third gate responsive to said second expanded output pulse to apply the pulses to be counted to said third counter, a fourth gate to produce a third output signal subsequent to the operation of said first, second and third gates, means including a third binary to produce a control signal only when the said third output signal is applied thereto and no output signal is present in said second binary, means to generate periodically recurring pulses, a fifth gate responsive to said control signal to apply said periodically recurring pulses to said second and third counters, and means to advance the number of pulses counted by said first counter in response to the number of said first output signals applied to said first binary.

6. A circuit for counting pulses during a selected interval, said circuit comprising means forming pulses having the same frequency as the signal applied thereto, means to generate start and stop signals defining said selected interval, said means to generate being synchronized with said pulses to produce a start signal coincident with one of said pulses, a first gate, a first counter to count the number of pulses applied thereto, means including said first gate responsive to said start signal to apply the pulses to be counted to said first counter, means to produce an output pulse having a pulse width equal to the time between said stop signal and the next pulse to be counted, said first gate being responsive to the termination of said output pulse to prevent the pulses to be counted from being counted by said first counter, means to expand said output pulse by a predetermined factor, a second gate, a second counter having a readout for providing the complement of the number of pulses applied thereto, said second counter producing a first output signal when the number of pulses counted thereby equals said predetermined factor, means including a first binary to store said first output signal, means including said second gate responsive to said expanded output pulse to apply the pulses to be counted to said second counter, a third gate to produce a control signal subsequent to the operation of said first and second gates, and means responsive to said control signal to alter the count taken by said first counter of the number of pulses occurring during said selected interval by the number of said first output signals applied to said first binary.

7. A circuit for counting pulses during a seelcted interval, said circuit comprising means forming pulses having the same frequency as the signal applied thereto, means to generate start and stop signals defining said selected interval, a first binary to produce a first output pulse having a pulse width equal to the time between said start signal and the next successive pulse to be counted, a first gate, a first counter to count one less than the number of pulses applied thereto, means including said first gate responsive to the termination of said first output pulse to apply the pulses to be counted to said first counter, an expander to expand said first output pulse by a predetermined factor, a second gate, a second counter to produce a first output signal when the number of pulses counted thereby equals a multiple of said predetermined factor, the readout of said second counter being physically located to provide the most significant fractional figures, a second binary to store said first output signal, means including said second gate responsive to said expanded output pulse to apply the pulse to be counted to said second counter, a third binary to produce a second output pulse having a pulse width equal to the time between said stop signal and the next successive pulse to be counted, said first gate precluding the pulses to be counted from being counted by said first counter in response to the termination of said second output pulse, means including said same expander to expand said second output pulse, a third gate, a third counter to produce a second output signal when the number of pulses counted thereby equals said predetermined factor, means including a fourth binary to store said second output signal, means including said third gate responsive to said second expanded output pulse to apply the pulses to be counted to said third counter, a fourth gate to produce a third output signal subsequent to the operation of said first, second and third gates, means including a fifth binary to produce a control signal only when the said third output signal is applied thereto and no output signal is present in said second binary, a fifth gate responsive to said control signal to apply the pulses to be counted to said second and third counters, and means to advance the number of pulses counted by said first counter in response to the number of said first output signals applied to said second binary.

8. A circuit for counting pulses during a selected interval, said circuit comprising means forming pulses having the same frequency as the signal applied thereto, means to generate start and stop signals defining said selected interval, a first binary to produce a first output pulse having a pulse width equal to the time between said start signal and the next successive pulses to be counted, a first gate, a first counter to count one less than the number of pulses applied thereto, means including said gate responsive to the termination of said first output pulse to apply the pulses to be counted to said first counter, first circuit means to expand said first output pulse by ten, a second gate, a first decade counter to produce a first carry signal when the number of pulses counted thereby equals multiples of ten, the readout of said first decade counter being physically located to the right of the decimal point to provide the most significant fractional figure, a second binary to store said first carry signal, means including said second gate responsive to said expanded output pulse to apply the pulse to be counted to said first decade counter, a third binary to produce a second output pulse having a pulse width equal to the time between said stop signal and the next successive pulse to be counted, said first gate precluding the pulses to be counted from being counted by said first counter in response to the termination of said second output pulse, second circuit means to expand said second output pulse by ten, a third gate, a second decade counter to produce a second carry signal when the number of pulses counted thereby equals ten, means including a fourth binary to store said second carry signal, means including said third gate responsive to said second expanded output pulse to apply the pulses to be counted to said second decade counter, a fourth gate to produce a first output signal subsequent to the operation of said first, second and third gates, a fifth binary to produce a control signal only when the said first output signal is applied thereto and no carry signal is present in said second binary, a fifth gate responsive to said control signal to apply the pulses to be counted to said second and third counters, and means to advance the number of pulses counted by said first counter in response to the number of said first carry signals applied to said second binary.

9. A circuit for counting pulses during a selected interval, said circuit comprising means forming pulses having the same frequency as the signal applied thereto, means to generate start and stop signals defining said selected interval, a first binary to produce a first output pulse having a pulse width equal to the time between said start signal and the next successive pulses to be counted, a first gate, a first counter to count one less than the number of pulses applied thereto, means including said gate responsive to the termination of said first output pulse to apply the pulses to be counted to said first counter, first circuit means to expand said first output pulse by ten, a second gate, a first decade counter to produce a first carry signal when the number of pulses counted thereby equals multiples of ten, the readout of said first decade counter being physically located to the right of the decimal point to provide the most significant fractional figure, a second binary to store said first carry signal, means including said second gate responsive to said expanded output pulse to apply the pulse to be counted to said first decade counter, a third binary to produce a second output pulse having a pulse width equal to the time between said stop signal and the next successive pulse to be counted, said first gate precluding the pulses to be counted from being counted by said first counter in response to the termination of said second output pulse, second circuit means to expand said second output pulse by ten, a third gate, a second decade counter to produce a second carry signal when the number of pulses counted thereby equals ten, means including a fourth binary to store said second carry signal, means including said third gate responsive to said second expanded output pulse to apply the pulses to be counted to said second decade counter, a fourth gate to produce a first output signal subsequent to the operation of said first, second and third gates, a fifth binary to produce a control signal only when the said first output signal is applied thereto and no carry signal is present in said second binary, means to generate periodically recurring pulses, a fifth gate responsive to said control signal to apply said periodically recurring pulses to said second and third counters, and means to advance the number of pulses counted by said first counter in response to the number of said first carry signals applied to said second binary.

10. A circuit according to claim 8 wherein said first and second circuit means have substantially similar circuitry, each comprising input and output terminals, a first transistor of one conductivity type, said input terminal connected to the base electrode of said first transistor, a first substantially constant current source, a direct current power supply having output terminals, means including said first current source connecting the collector electrode of said first transistor and one output terminal of said power supply, a point of reference potential, means connecting the emitter electrode of said first transistor and said point of reference potential, a second substantially constant current source, a second transistor, a diode, means including serially connected diode and said second current source connecting the emitter electrode of said second transistor and said one output terminal of said power supply, means connecting the base electrode of said second transistor and said point of reference potential, a capacitor connecting the collector electrode of said first transistor and the common terminal of said diode and said second current source, a resistor connecting the collector electrode of said second transistor and the other terminal of said power supply, and means connecting the collector electrode of said second transistor and said output terminal.

11. A circuit according to claim 8 wherein said first and second circuit means have substantially similar circuitry each comprising input and output terminals, a first transistor of one conductivity type, said input terminal connected to the base electrode of said first transistor, a direct current power supply having output terminals, a second transistor, means including a first resistor connecting the emitter electrode of said second transistor and one terminal of said power supply, a voltage source connecting the base electrode of said second transistor and said one terminal of said power supply, means connecting the collector electrodes of said first and second transistors, a point of reference potential, means connecting the emitter electrode of said first transistor and said point of reference potential, a third transistor, means including a second resistor connecting the emitter electrode of said third transistor and said one terminal of said power supply, means connecting the base electrode of said second and third transistors, a fourth transistor, means including a diode connecting the emitter electrode of said fourth transistor and the collector electrode of said third transistor, means connecting the base electrode of said fourth transistor and said point of reference potential, a capacitor connecting the collector electrode of said first transistor and the collector electrode of said third transistor, a third resistor connecting the collector electrode of said fourth transistor and the other terminal of said power supply, and means connecting the collector electrode of said fourth transistor and said output terminal.

12. A circuit for counting pulses during a selected interval, said circuit comprising means forming pulses having a frequency related to the frequency of the signal applied thereto, means to generate start and stop signals defining said selected interval, a gate, first pulse counting means to count the number of pulses applied thereto according to a predetermined radix system, means including said gate to apply the pulses to said first counting means in response to said start signal, second pulse counting means, means to apply pulses to said second pulse counting means for a period related by a predetermined multiple of said radix to the interval between said start signal and the next successive pulse to be counted, the second pulse counting means counting pulses during said period, third pulse counting means, means to apply pulses to said third pulse counting means for a period related by said same multiple to the time interval between said stop signal and the pulse occurring prior to said stop signal, the third pulse counting means counting pulses during said last-mentioned period, and means responsive to the counts taken by the second and third pulse counting means to alter the count of said first counting means.

13. A circuit for counting pulses during a selected interval, said circuit comprising means forming pulses having the same frequency as the signal applied thereto, means to generate start and stop signals defining said selected interval, a gate, first pulse counting means to count the number of pulses applied thereto according to a predetermined radix system, means including said gate to apply the pulses to said first counting means in response to said start signal, second pulse counting means, means to apply pulses to said second pulse counting means for a period related by a predetermined multiple of said radix to the interval between said start signal and the next successive pulse to be counted, the second pulse counting means counting pulses during said period, third pulse counting means, means to apply pulses to said third pulse counting means for a period related by said same multiple to the time interval between said stop signal and the pulse occurring prior to said stop signal, the third pulse counting means counting pulses during said last-mentioned period, one of the second and third counting means being adapted to produce an output signal when the number of pulses applied thereto equals a multiple of said radix, means to apply to said one of the second and third counting means a number of pulses equal to the count taken by the other of said second and third counting means, and means responsive to said output signal to alter the count of said first counting means.

14. A circuit for counting pulses during a selected interval, said circuit comprising means forming pulses having the same frequency as the signal applied thereto, timer means to generate start and stop signals defining said selected interval, the timer means being adapted to produce said start signal at the occurrence of a pulse to be counted, a gate, first pulse counting means to count the number of pulses applied thereto according to a predetermined radix system, means including said gate to apply the pulses to said first counting means in response to said start signal, second pulse counting means, means to apply pulses to said second pulse counting means for a period related by a selected multiple of said radix to the time interval between said stop signal and the pulse occurring prior to said stop signal, the second pulse counting means counting pulses during said period, and means responsive to the count taken during said period to alter the count of said first counting means.

15. A circuit for counting pulses during a selected interval, said circuit comprising means forming pulses having the same frequency as the signal applied thereto, timer means to generate start and stop signals defining said selected interval, the timer means being adapted to produce said start signal at the occurrence of a pulse to be counted, a gate, first pulse counting means to count the number of pulses applied thereto according to a predetermined radix system, means including said gate to apply the pulses to said first counting means in response to said start signal, second pulse counting means, means to apply pulses to said second pulse counting means for a period related by a selected multiple of said radix to the time interval between said stop signal and the next successive pulse to be counted, the second pulse counting means counting pulses during said period, and means responsive to the count taken during said period to alter the count of said first counting means.

16. Apparatus for increasing the accuracy of the count taken of events occurring in a selected time interval that is initiated by a start signal and is terminated by a stop signal, said apparatus comprising means to count events occurring in said selected interval, means producing a first signal related to the interval between said start signal and the occurrence of a succeeding event, means to vary said first signal with time, means to count events occurring in the time said first signal is varying, means to produce a second signal related to the interval between said stop signal and a succeeding event, means to vary said second signal with time, means to count events occurring in the time said second signal is varying, means to increase the count taken of events occurring during the time said first signal is varying by the complement of the count taken of events occurring during the time said second signal is varying, and means to alter the count taken of events occurring in said selected interval in accordance with the increased count.

17. Apparatus for increasing the accuracy of the count taken of events occurring in a selected time interval which is initiated at the occurrence of an event to be counted and which is terminated by a stop signal, said apparatus comprising means to count events occurring in said selected interval, means producing a signal related to the time interval between said stop signal and a succeeding event, means to vary said signal with time, means to count events occurring during the time said signal is varying, and means to alter the count taken of events occurring during said selected interval in accordance with the count taken of events during the time said signal is varying.

References Cited in the file of this patent
UNITED STATES PATENTS 2,665,410   Burbeck _____ Jan. 5, 1954
2,896,160   Kronacher _____ July 21, 1959